United States Patent Office 3,512,883
Patented May 19, 1970

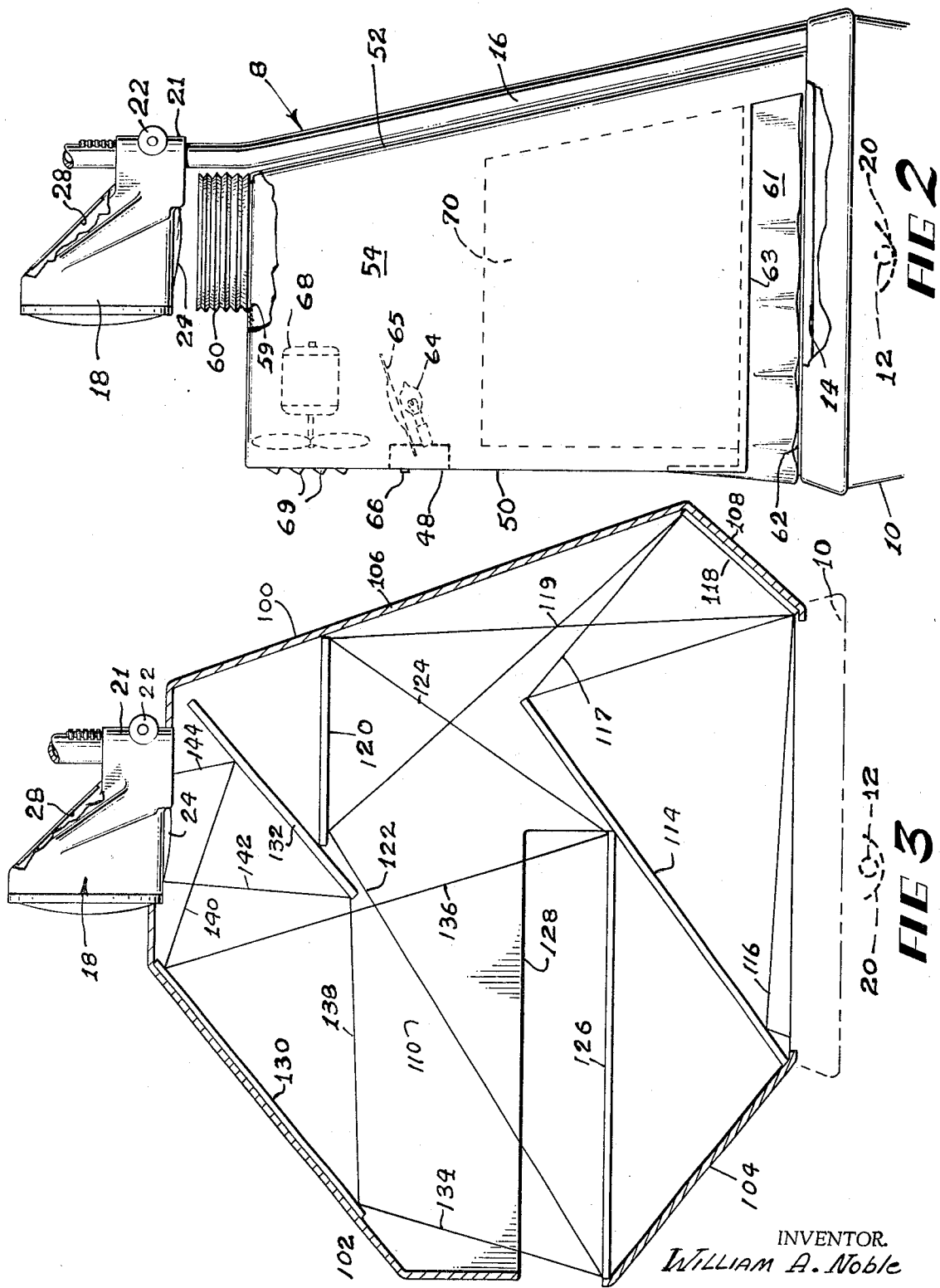

3,512,883
PROJECTION APPARATUS FOR OPAQUE OBJECTS
William A. Noble, St. Paul, Minn.; Delores E. Noble, administratrix of the estate of said William A. Noble, deceased
Filed May 19, 1967, Ser. No. 639,730
Int. Cl. G03b 21/08, 21/28
U.S. Cl. 353—64                            2 Claims

ABSTRACT OF THE DISCLOSURE

Projection apparatus for opaque objects including a housing to be used with an overhead projector such that the projection lens of the latter serves as one optical element of the projector. Illumination is either supplied by reflecting light from the overhead projector onto the opaque object or by an auxiliary light source located within the housing.

---

This invention relates to optical instruments and more particularly to projection equipment. The invention is particularly useful for projecting the image of an opaque object.

Overhead projectors of the type described in Pat. No. 3,126,786 employ a Fresnel lens as a condenser. The condenser is spaced about eight inches from the projection lamp. A relatively large transparent object or original copy is placed in contact with the Fresnel lens during operation. A glass projection lens is spaced from about ten to twelve inches from the Fresnel lens and in optical alignment with it. A mirror is positioned adjacent to the projection lens for directing the image horizontally onto a wall or screen. Owing to the large size of the Fresnel lens, the overhead projector will easily accommodate relatively large objects such as 8½ x 11 inch transparent sheets. Commercially available overhead projectors also have the ability to project a relatively large image onto a screen positioned only a few feet from the projector.

While overhead projectors of this kind have been eminently successful in present visual data for a variety of purposes, they are entirely unsuited for projecting the image of opague objects such as the pages of books, newspapers, printed reports, charts or visual information present on the surface of natural objects such as biological or geological specimens, etc. As a result, the manufacturer of one commercially available overhead projector provides a special system for projecting opaque objects. In this system the opaque object is passed through a machine that prints a copy of the image on a transparent sheet which is placed adjacent to the Fresnel lens and projected as any other transparency. This operation, of course, necessitates the purchase of a copying machine and the preparation of a copy is frequently time-consuming and inconvenient.

In view of the deficiencies of the prior art, it is one object of the present invention to provide an apparatus adapted to be used in conjunction with commercially available overhead projectors for projecting the image of opaque objects, opaque printed material, books, reports and the like.

Another object of the present invention is the provision of an improved projection apparatus suited for projecting the image of opaque objects through the projection lens assembly of an overhead projector and including a reliable provision for preventing the undesired escape of light.

A further object of the invention is the provision of an improved projection apparatus of the type described wherein visual objects can be easily and quickly mounted removed from the projection stage.

A still further object of the invention is the provision of an improved projection apparatus for opaque objects wherein the operator is able to view objects located on the projection stage while they are being projected.

Still another object of the invention is the provision of an improved projection apparatus for opaque objects wherein an overhead projector provides illumination for the opaque object.

These and other more detailed and specific objects and advantages of the invention will become apparent in view of the accompanying description setting forth a specific form of the invention and by the accompanying drawings wherein:

FIG. 2 is a side elevational view of the housing shown in FIG. 1 as it appears when mounted in the operating position on an overhead projector.

FIG. 3 is a semi-diagrammatic vertical sectional view of another form of projection apparatus in accordance with the invention.

Figure 1:
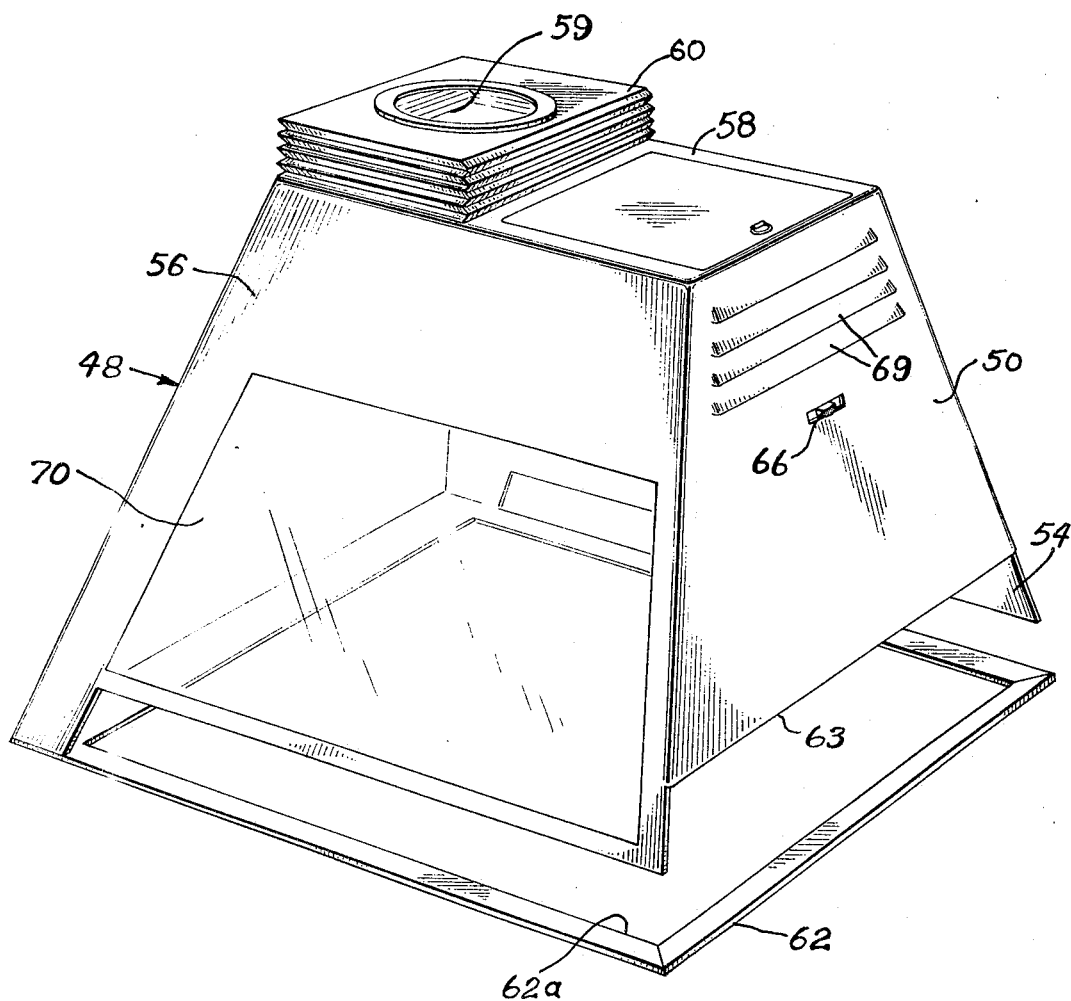
FIG. 1 is a perspective view of a projection apparatus housing embodying the present invention.

Briefly, the present invention provides a projection apparatus of the type which can be used for projecting the image of an opaque object onto a screen. The invention is particularly useful as a supplemental or accessary unit in connection with commercially available overhead projectors and when used in this manner the projection lens assembly of the overhead projector is employed as one of the optic elements of the instrument. The projection lens assembly of the overhead projector includes at least one lens element. A means is operatively associated with the projection lens assembly for changing the position of the assembly to focus the image on the screen. A reflecting mirror or prism is mounted adjacent to the lens element in position to reflect the entering vertical rays horizontally to a screen or other image surface. An enclosure is mounted below the projection lens assembly. It includes a stage for supporting opaque objects that are to be viewed on the screen. A means is provided for directing the light from a projection lamp onto an object placed on the stage. The enclosure has an opening at its top positioned in alignment with the projection lens assembly through which the rays pass from the enclosure to the projection lens assembly. Another opening is provided in the enclosure adjacent to the stage through which objects can be placed on the stage.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

Refer now to FIGS. 1 and 2 which illustrate one form of the present invention wherein a projector housing is designed to be used as an accessory for a commercially available overhead projector to convert the overhead projector for applications requiring the projection of opaque objects.

The overhead projector is designated 8. It includes a base 10 having a projection lamp 12. A Fresnel lens 14 serves as an object supporting platform and as a condensing lens. A bracket 16 extends vertically for supporting a projection lens assembly 18. The lamp 12 is mounted in optical alignment with the Fresnel lens 14 and is positioned several inches below it. Below lamp 12 is a reflector 20 for directing the illumination upwardly through the Fresnel lens 14.

At the top of bracket 16 is provided a rack and pinion gear assembly 21. A small knob 22 is connected to the pinion gear for raising and lowering the lens assembly 18 on the upward end of the bracket 16 to focus the projected image. The lens assembly 18 is provided with one or more lens elements including a horizontally disposed projection lens 24. Positioned adjacent lens 24 and immediately above it is a mirror 28 oriented at an angle of about 45° so as to reflect the vertical rays entering from below through lens 24 along a horizontal axis. Thus, a beam will pass upwardly into the lens assembly 18, strike mirror 28 and exit on a horizontal axis.

The portion of the projector described thus far is entirely conventional. When the projector is used without the invention, a relatively large transparent object such as an 8½ x 11 inch transparent film having visible markings on it is placed on the supporting platform defined by the Fresnel lens 14. The knob 22 is then turned sliding the assembly 18 up or down on the bracket 16 to focus an image of the visible markings on a screen or other viewing surface.

As mentioned briefly above, the projection apparatus in accordance with this form of the invention is used as an accessory and can be easily and quickly mounted upon or removed from the overhead projection unit already described.

The accessory projection apparatus includes a housing or enclosure indicated generally by the numeral 48. The enclosure 48 consists of front and rear walls 50 and 52 respectively which are connected by laterally spaced side walls 54 and 56 and a horizontally disposed top wall 58 having an opening 59 therein to which is secured an upwardly extending bellows 60. The upper end of bellows 60 contacts the lower portion of the assembly 18 during operation for the purpose of preventing the escape of light. At the base of the enclosure 48 is a rectangular horizontally disposed supporting stand 62 which has an opening 62a therein (FIG. 1). The cross sectional area of the housing 48 above the stand 62 defines a stage for the object being viewed. A variety of different opaque objects can be placed on the stage as will be described more fully hereinbelow.

At the base of the housing immediately above the stand 62 is an opening 62a in each of the side walls except the rear wall 52. The upper edge of the opening 63 is spaced in practice about 2 inches above the stand 62. The opening 63 is adapted to allow books, photographic or other opaque objects to be inserted and removed from the stage.

Connected to the upper edge of opening 63 and depending downwardly therefrom is a flexible light shield or skirt 61 (FIG. 2) which can be formed from a fabric. The skirt 61 functions to prevent the escape of light from the enclosure. The light shield, it will be understood, can be constructed in other ways for example from a strip of sheet metal adapted to slide up and down adjacent the lower edges of the enclosure.

Mounted within the enclosure adjacent the top portion thereof is a projection lamp 64. Adjacent the lamp is a metallic reflector 65 positioned to direct light downwardly onto the stage. A switch 66 is connected to the lamp. Current can be supplied from a wall socket through conductors which are not shown. A blower 68 is preferably mounted within the enclosure for exhausting hot air through louvers 69. Within the side wall 56 is provided a transparent viewing window 70 preferably formed from transparent glass containing a light absorbing material such as pigment, green coloring material or the like. The operator can inspect the object through this window at all times.

It was found that a brightly illuminated sharply focused image of an opaque object placed on the stage can be focused on a projection screen at a remote point. The image will be of an appropriate size to almost completely fill the screen. During operation, rays passing upwardly from stage 62a through the lens assembly 18 will be focused at the same distance from lens 24 as it would be if the housing 48 were not in use.

It can thus be seen that the supplimentary projection apparatus 48 although simple in construction makes possible the direct projection of opaque objetcs. The projected image will fill almost the entire screen. It is of good quality and is in proper focus. This image in addition is erect on the screen and is right reading (not a mirror image). Escape of light from the housing is reliably prevented. While with most opaque projectors the image is focused at a distance of thirty feet or more from the projector, an image can be projected with the projector 8 placed at relatively short distance from the viewing screen, e.g. as little as from six to twelve feet. This makes possible projection from the front rather than from the rear of the room. This advantage of the invention is particularly important in classroom teaching since the teacher can operate the equipment from a location close to the viewing screen thus keeping the students' attention directed toward the projection area.

Refer now to FIG. 3 which illustrates an embodiment of the invention which is also useful for projecting the image of opaque objects. As shown in the figure, the projection apparatus consists of a housing 100 having a front wall including upper and lower sections 102 and 104, a rear wall including upper and lower sections 106 and 108 and two identical laterally spaced apart side walls only one of which (110) is shown. The housing 100 rests upon the base 10 of the overhead projector 8 which is identical with that described in connection with FIGS. 1 and 2. The upper surface of the base in this instance acts as a support means for the housing 100. Mounted within the housing 100 and positioned immediately above the base 10 is a mirror 114 inclined at an angle slightly less than 45° with respect to the horizontal for directing a beam exemplified by rays 116 and 117 onto a second smaller mirror 118. The rays then focus at point 119 and are reflected downwardly again from a horizontally disposed mirror 120 positioned in alignment with the upper end of the mirror 114. After striking the mirror 120, the rays pass downwardly as shown at 122 and 124 onto the stage 126. For the purpose of enabling large objects to be placed on stage 126, both side walls are provided with slots 128 to enable objects placed on stage 126 to project laterally beyond the side walls. The object on the stage 126 illuminated in this manner is placed in optical alignment with the projection assembly 18 by the provision of two inclined laterally spaced mirrors including a first mirror 130 positioned immediately above stage 126 inclined at an angle of about 45° relative to the horizontal and a second smaller mirror 132 positioned in optical alignment with the base 10 and the housing 18. In this manner, the light transmitted from the object on the stage exemplified by rays 134 and 136 and directed laterally at 138 and 140, thence vertically at 142 and 144 into projection lens 24.

Is is apparent that many modifications and variations of this invention as hereinbefore set forth may be made without departing from the spirit and scope thereof. The specific embodiments described are given by way of example only and the invention is limited only by the terms of the appended claims.

I claim:

1. A projection apparatus comprising in combination a base and a projection lens assembly, said projection lens assembly including at least one lens element, a reflector means mounted thereon adjacent to the lens element, said reflector means being positioned to reflect vertical rays of light horizontally, a support means for supporting the projection lens assembly above the base, a positioning means operatively associated with the projection lens assembly for changing the position of the projection lens assembly to focus an image of an object, an object enclosure mounted between the base and the projection lens assembly, said object enclosure having an object stage therein, a projection lamp mounted below the stage in said base and optically associated with the enclosure to direct rays of light upwardly towards the object placed on the stage to illuminate the object, reflective means mounted within the enclosure in optical alignment with the projection lamp and stage for directing rays of light eminating from the lamp onto said object, mirror means mounted in the enclosure above the stage for directing the rays of light from the object to the projection lens assembly, said enclosure having an opening therein positioned above the projection lamp and in optical alignment with the stage and the mirror means whereby rays of light from the object placed upon the stage and illuminated by the projection lamp are reflected upwardly through the said opening and projection lens assembly and are focused thereby at a remote point.

2. The projection apparatus according to claim 1 wherein the reflective means comprises a first inclined mirror in optical alignment with the lamp for directing rays of light from the lamp laterally, a second mirror positioned to receive the rays of light from the first mirror to direct the rays upwardly, a third mirror positioned to receive the rays of light from the second mirror to direct the rays downwardly, the stage being positioned to receive the rays of light reflected from the third mirror whereby the object on stage will be illuminated from its upper surface by the lamp, said mirror means includes a fourth mirror positioned above the stage for directing rays of light transmitted from the object laterally and a fifth mirror positioned to receive the rays of light from the fourth mirror and to reflect the same upwardly through said opening and into said projection lens assembly.

References Cited

UNITED STATES PATENTS

| 700,447   | 5/1902  | Smith      | 353—64 |
| 2,596,393 | 5/1952  | Fitzgerald | 353—66 |
| 2,860,543 | 11/1958 | Miles      | 353—64 |
| 3,357,300 | 12/1967 | Cornell    | 353—99 |

NORTON ANSHER, Primary Examiner

R. M. SHEER, Assistant Examiner

U.S. Cl. X.R.

353—61, 66, 97, 99